United States Patent
Okada

(10) Patent No.: US 7,612,327 B2
(45) Date of Patent: Nov. 3, 2009

(54) OPTICAL ENCODER AND ELECTRONIC EQUIPMENT HAVING THE SAME

(75) Inventor: Norikazu Okada, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/204,656

(22) Filed: Sep. 4, 2008

(65) Prior Publication Data

US 2009/0072129 A1 Mar. 19, 2009

(30) Foreign Application Priority Data

Sep. 6, 2007 (JP) ............................. 2007-231227

(51) Int. Cl.
G01D 5/34 (2006.01)

(52) U.S. Cl. ........................... 250/231.13; 250/231.16; 250/231.18

(58) Field of Classification Search ................................
250/231.13–231.18, 237 R, 237 G; 356/616–619;
341/11, 13, 31; 359/436–442, 556; 33/1 N,
33/1 PT; 708/625, 626, 200; 326/52–55,
326/62, 104–135
See application file for complete search history.

(56) References Cited

U.S. PATENT DOCUMENTS

| | | | | |
|---|---|---|---|---|
| 4,047,007 A | * | 9/1977 | Dlugos et al. ................ | 702/102 |
| 4,079,251 A | * | 3/1978 | Osann, Jr. ............... | 250/231.16 |
| 4,143,364 A | * | 3/1979 | Dlugos ........................... | 341/6 |
| 4,769,630 A | * | 9/1988 | Taillebois et al. ............... | 341/8 |
| 4,965,816 A | * | 10/1990 | Shih et al. ....................... | 377/17 |
| 5,438,193 A | * | 8/1995 | Takagi et al. ........... | 250/231.18 |
| 5,982,194 A | * | 11/1999 | Worrell ......................... | 326/41 |
| 6,002,249 A | * | 12/1999 | Futsuhara .................... | 324/160 |
| 6,031,218 A | * | 2/2000 | Piot et al. ................ | 250/208.2 |
| 7,139,788 B2 | * | 11/2006 | Talwar et al. ................ | 708/626 |
| 7,227,125 B2 | * | 6/2007 | Sannomiya et al. .... | 250/231.13 |
| 7,275,076 B2 | * | 9/2007 | Talwar et al. ................ | 708/625 |
| 7,391,010 B2 | | 6/2008 | Okada et al. | |
| 7,439,489 B2 | * | 10/2008 | Sasaki et al. ........... | 250/231.13 |
| 2006/0226349 A1 | * | 10/2006 | Okada et al. ........... | 250/231.13 |
| 2008/0054167 A1 | * | 3/2008 | Sasaki et al. ................. | 250/216 |
| 2009/0008537 A1 | * | 1/2009 | Kimura et al. ............ | 250/231.1 |
| 2009/0072129 A1 | * | 3/2009 | Okada ......................... | 250/229 |

FOREIGN PATENT DOCUMENTS

JP 1-136019 A 5/1989

(Continued)

*Primary Examiner*—John R Lee
(74) *Attorney, Agent, or Firm*—Birch, Stewart, Kolasch & Birch, LLP

(57) ABSTRACT

An optical encoder of the invention has an OR circuit 21 to which light reception signals A+, B+ are inputted, an OR circuit 22 to which light reception signals A−, B− are inputted, and an AND circuit 23 to which an output signal C of the OR circuit 21 and an output signal D of the OR circuit 22 are inputted. In this optical encoder, a light reception signal A− shifted in phase by 180° from the light reception signal A+, and a light reception signal B− shifted in phase by 180° from the light reception signal B+, are inputted to the OR circuit 22 of the signal processing circuit 15. Thus, the signal processing circuit 15 does not need NOT circuits for inverting the light reception signal A+ and B+. This optical encoder can avoid occurrence of phase differences due to gate delay among signals and detect the mover with signals of excellent duty and periodic precisions.

7 Claims, 10 Drawing Sheets

FOREIGN PATENT DOCUMENTS

| | | |
|---|---|---|
| JP | 1-156621 A | 6/1989 |
| JP | 3-37518 A | 2/1991 |
| JP | 5-152907 A | 6/1993 |
| JP | 7-12924 U | 3/1995 |
| JP | 7-507436 A | 8/1995 |
| JP | 2007-40959 A | 2/2007 |
| WO | WO-94/26028 A1 | 11/1994 |

* cited by examiner

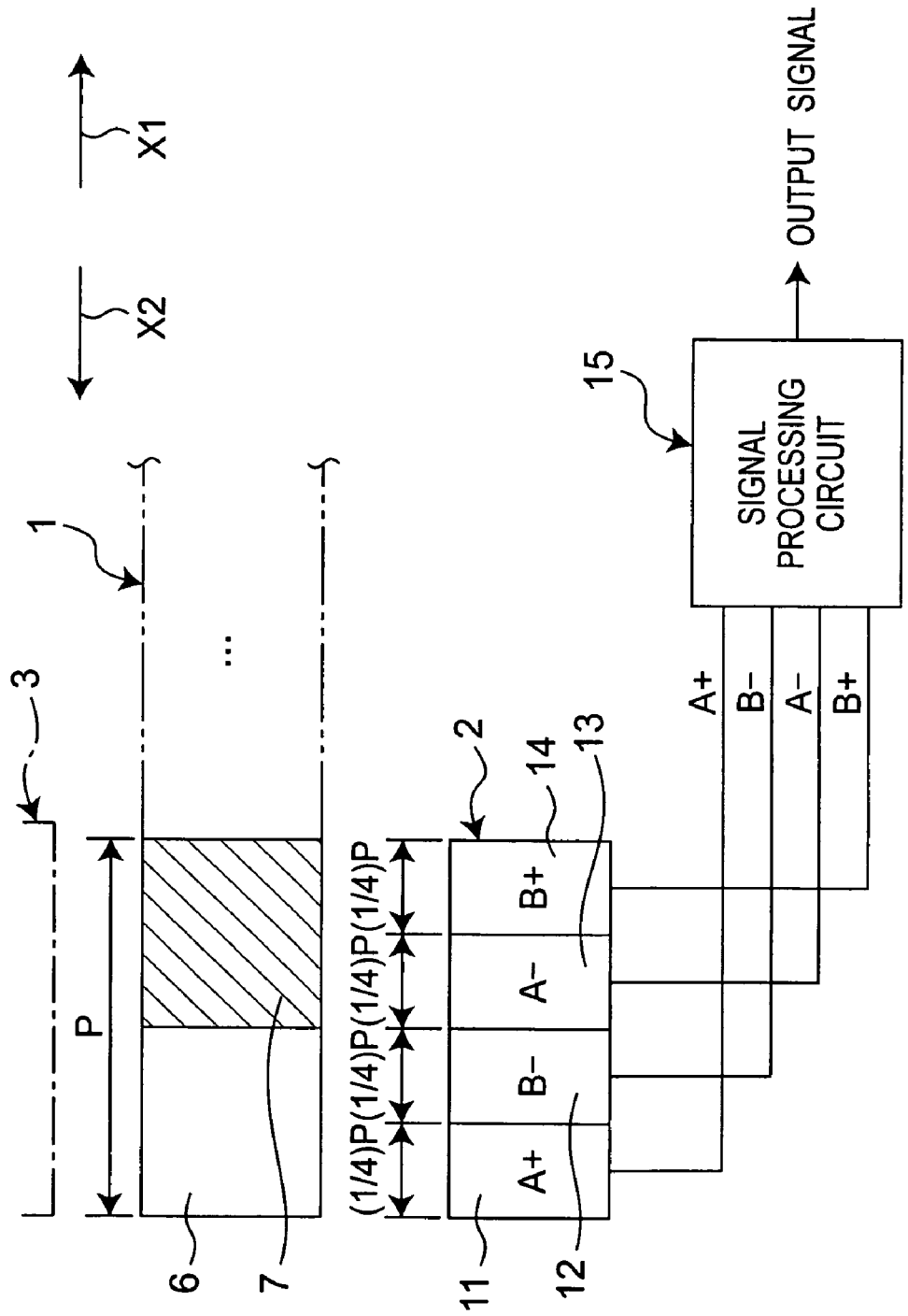

OPTICAL ENCODER AND ELECTRONIC EQUIPMENT HAVING THE SAME

CROSS-REFERENCE TO RELATED APPLICATIONS

This nonprovisional application claims priority under 35 U.S.C. §119(a) on Patent Application No(s). 2007-231227 filed in Japan on Sep. 6, 2007, the entire contents of which are hereby incorporated by reference.

BACKGROUND OF THE INVENTION

The present invention relates to an optical encoder for detecting position, moving speed, moving direction and the like of a mover with use of light receiving elements. In particular, the invention relates to an optical encoder suitable for use in copiers, printers or other printing devices, FA (Factory Automation) equipment, and the like.

Conventionally, JP H1-136019 A discloses an encoder in which pulse signals having a phase difference of 90° are inputted to an EXCLUSIVE-OR circuit, allowing a resolution twice higher than conventional ones to be obtained.

Also, JP H1-156621 A discloses an optical encoder in which four signals different in phase by 45° are inputted to an EXCLUSIVE-OR circuit to obtain two signals different in phase by 90°.

Also, JP H3-37518 A discloses an encoder in which a signal obtained by EXCLUSIVE-ORing signals of a 90° phase difference is inputted as a clock for a shift register while one of the original signals of a 90° phase difference is used as data input in order to read forward and reverse rotations of a rotor.

Also, JP H7-12924 U discloses an encoder in which $2^{n-1}$ rectangular-wave signals are created from 2' optical sensor outputs so that the resolution is increased twofold.

Also, JP 2007-40959 A discloses an encoder in which a plurality of signals of different phases obtained from light receiving elements, which are subdivided for mover slits, are EXCLUSIVE-ORed to output a signal having a frequency higher than an on/off frequency by the mover.

Generally, for encoders, it is known that a twice higher resolution can be obtained from pulse signals having a 90° phase difference by using an EXCLUSIVE-OR circuit as shown in the above JP H1-136019 A and JP H1-156621 A.

However, in the case where two pulse signals are EXCLUSIVE-ORed as shown above, there inevitably occurs a 1-gate delay within the logic circuit.

In ordinary logic circuits, that delay falls within an error range. However, in a light receiving circuit including light receiving elements that treat weak signals, the 1-gate delay causes impedance differences between signal input and output, which leads to variations in the duty ratio of an output signal, with the periodic fluctuation increased. As a result, there is a problem that merits by twice higher resolutions could not be obtained.

Also, in JP H3-37518 A, logically combining a signal obtained by EXCLUSIVE-ORing with an original signal before the logical operation of EXCLUSIVE-ORing would involve a further gate delay, resulting in a easier occurrence of malfunction.

Also, in JP H7-12924 U and JP 2007-40959 A, although signal pulses are produced by using signal of reverse phase obtained from light receiving elements, yet inputting two pulses having a 90° phase difference to the logical operation input section would cause the gate delay to occur.

SUMMARY OF THE INVENTION

Accordingly, an object of the present invention is to provide an optical encoder which is enabled to avoid occurrence of phase differences among signals due to gate delay and to detect the mover with signals of excellent duty precision and periodic precision.

In order to achieve the above object, there is provided an optical encoder comprising: a light emitting section; a light receiving section having a plurality of light receiving elements placed in array along one direction in a region that can be reached by light derived from the light emitting section, and a mover having light-on portions which make the light incident on the light receiving elements and light-off portions which inhibit the light from being incident on the light receiving elements, the light-on portions and the light-off portions alternately pass through specified positions corresponding to the light receiving elements when the mover moves along the one direction, wherein the optical encoder detects movement of the mover, the optical encoder further comprising:

a signal processing section to which a first light reception signal and second, third and fourth light reception signals shifted in phase by 90°, 180°, 270° respectively from the first light reception signal are inputted from the light receiving section, and which balances gate delays due to signal processing for each of the first to fourth light reception signals with one another.

According to the optical encoder of this invention, a third light reception signal shifted in phase by 180° from the first light reception signal, and a fourth light reception signal shifted in phase by 180° from the second light reception signal, are inputted to the signal processing section. Therefore, the signal processing section has neither a need for a NOT circuit for inverting the first light reception signal nor a need for a NOT circuit for inverting the second light reception signal.

Thus, in the signal processing section, by balancing gate delays by signal processing for the first to fourth light reception signals, occurrence of phase differences due to the gate delays can be avoided, making it possible to detect the mover with a signal of excellent duty precision and periodic precision.

In one embodiment of the invention, the signal processing section comprises:

a first AND circuit or a first NOR circuit to which a pair of light reception signals different in phase by 90° from each other out of the first to fourth light reception signals are inputted;

a second AND circuit or a second NOR circuit to which a pair of light reception signals different in phase by 90° from each other than the above-inputted pair of light reception signals out of the first to fourth light reception signals are inputted; and an OR circuit or a NOR circuit to which an output signal of the first AND circuit or first NOR circuit and an output signal of the second AND circuit or second NOR circuit are inputted.

According to the embodiment, from a pair of light reception signals different in input phase by 90° from each other, the first, second AND circuits (or the first, second NOR circuits) each produce a signal having a duty ratio of 1:3 within one period of the light reception signals. A signal having a duty ratio of 1:3 produced by the first AND circuit (or the first NOR circuit), and a signal having a duty ratio of 1:3 produced by the second AND circuit (or the second NOR circuit), are different in phase by 180° from each other, and are of a good matching with each other.

Then, the OR circuit (or the NOR circuit) ORs (or NORs) the two signals that are different in phase by 180° from each other and are of a good matching. As a result of this, from the OR circuit (or NOR circuit), an output signal having a frequency twice higher than that of the light reception signals and being of excellent duty precision and periodic precision can be obtained.

In one embodiment of the invention, the signal processing section comprises:

a first OR circuit or a first NAND circuit to which a pair of light reception signals different in phase by 90° from each other out of the first to fourth light reception signals are inputted;

a second OR circuit or a second NAND circuit to which a pair of light reception signals different in phase by 90° from each other than the above-inputted pair of light reception signals out of the first to fourth light reception signals are inputted; and an AND circuit or a NAND circuit to which an output signal of the first OR circuit or first NAND circuit and an output signal of the second OR circuit or second NAND circuit are inputted.

According to the embodiment, from a pair of light reception signals different in input phase by 90° from each other, the first, second OR circuits (or the first, second NAND circuit) each produce a signal having a duty ratio of 1:3 within one period of the light reception signals. A signal having a duty ratio of 1:3 produced by the first OR circuit (or the first NAND circuit), and a signal having a duty ratio of 1:3 produced by the second OR circuit (or the second NAND circuit), are different in phase by 180° from each other, and are of a good matching with each other.

Then, the AND circuit (or the NAND circuit) ORs (or NORs) the two signals that are different in phase by 180° from each other and are of a good matching. As a result of this, from the AND circuit (or NAND circuit), an output signal having a frequency twice higher than that of the light reception signals and being of excellent duty precision and periodic precision can be obtained.

In one embodiment of the invention, the signal processing section comprises:

a first A/D converter to which a pair of light reception signals different in phase by 180° from each other out of the first to fourth light reception signals are inputted and which outputs a pair of output signals different in phase by 180° from each other; and a second A/D converter to which a pair of light reception signals different in phase by 180° from each other than the above-inputted pair of light reception signals out of the first to fourth light reception signals are inputted and which outputs a pair of output signals different in phase by 180° from each other.

According to the embodiment, the first, second A/D converters perform A/D conversion of a pair of light reception signals, respectively, which are 180° different in input phase from each other, to output a pair of output signals which are 180° different in phase from each other. Thus, by the A/D converters, two-phase output signals of positive phase and opposite phase, which are 180° different in phase from each other, can be taken out together, so that no delay occurs between the two-phase output signals. Then, the positive-phase output signal outputted by the first A/D converter and the positive-phase output signal outputted by the second A/D converter are shifted in phase by 90° from each other, and the opposite-phase output signal outputted by the first A/D converter and the opposite-phase output signal outputted by the second A/D converter are shifted in phase by 90° from each other. Thus, from the first, second A/D converters, four output signals shifted in phase each exactly by 90° from one another can be obtained.

In one embodiment of the invention, the first A/D converter has a first output transistor section for outputting the pair of output signals and a first drive section for driving the first output transistor section, and the second A/D converter has a second output transistor section for outputting the pair of output signals and a second drive section for driving the second output transistor section, wherein the first drive section is shared by a pair of output signals outputted by the first output transistor section and the second drive section is shared by a pair of light reception signals outputted by the second output transistor section.

According to the embodiment, in the first, second A/D converters, the first, second drive sections are shared for a pair of output signals produced by the first, second output transistor sections, respectively. Like this, by commonizing the drive sections for two output signals of non-inverted phase and inverted phase as shown above, it becomes possible to prevent occurrence of gate delays between the two output signals of non-inverted phase and inverted phase.

In one embodiment of the invention, the signal processing section has a logical operation section which performs an equal number of times of logical operations for each of the first to fourth light reception signals.

According to the embodiment, since the logical operation section included in the signal processing section performs an equal number of times of logical operations for each of the light reception signals, gate delay differences among the light reception signals can be solved.

In one embodiment of the invention, an electronic equipment includes the above optical encoder.

In this embodiment, there can be provided high-reliability electronic equipment which is enabled to avoid occurrence of phase differences due to gate delays among signals and to detect any movement of the mover with high precision.

According to the optical encoder of this invention, a third light reception signal shifted in phase by 180° from the first light reception signal, and a fourth light reception signal shifted in phase by 180° from the second light reception signal, are inputted to the signal processing section. Therefore, the signal processing section has neither a need for a NOT circuit for inverting the first light reception signal nor a need for a NOT circuit for inverting the second light reception signal.

Thus, in the signal processing section, by balancing gate delays by signal processing for the first to fourth light reception signals, phase differences occurred among signals due to the gate delays can be avoided, making it possible to detect the mover with a signal of excellent duty precision and periodic precision.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 1 is a block diagram showing an outlined configuration of a first embodiment of the optical encoder of the present invention;

DETAILED DESCRIPTION OF THE INVENTION

Figure 2A:
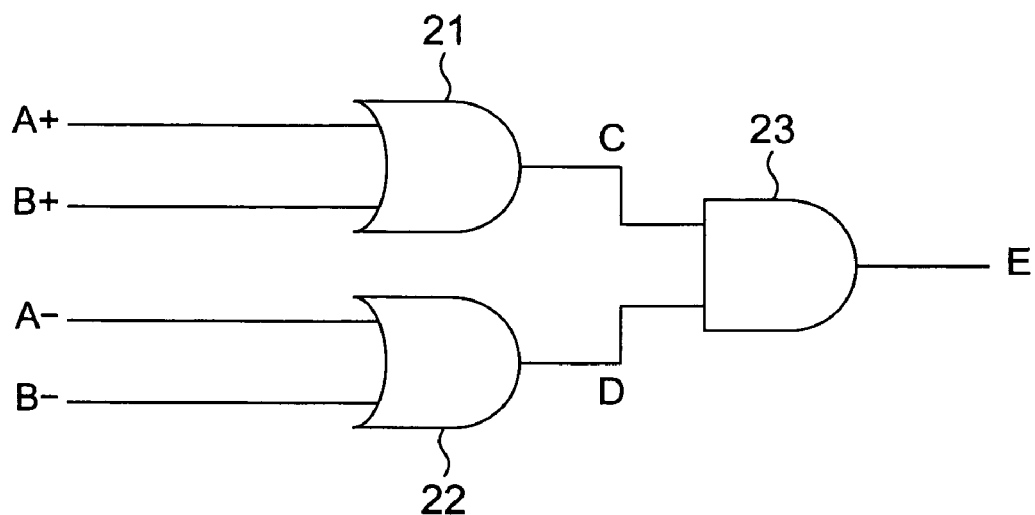
FIG. 2A is a view showing a structure of a signal processing circuit 15 included in the first embodiment.

Hereinbelow, the present invention will be described in detail by way of embodiments thereof illustrated in the accompanying drawings.

First Embodiment

FIG. 1 shows an outlined configuration of a first embodiment of the optical encoder of the invention. The first embodiment includes a mover 1, a light receiving section 2 and a light emitting section 3. The light emitting section 3 is composed of light emitting elements such as LEDs (light emitting diodes).

The light receiving section 2 has four light receiving elements 11-14. For higher resolutions, the light receiving section 2 may also include a larger number, such as 8 or 16, of light receiving elements arranged therein. The mover 1 is movable in a direction indicated by arrow X1 or X2, where light-on portions 6 and light-off portions 7 are alternately arrayed along the moving direction. Given an array pitch P of the light-on portions 6, each of the light-on portions 6 and the light-off portions 7 has a size in the moving direction (width) equal to (½)P. The light-on portions 6 transmit light derived from the light emitting section 3 toward the light receiving section 2 side, while the light-off portions 7 do not transmit light derived from the light emitting section 3 toward the light receiving section 2 side. It is noted that the light receiving elements 11-14 are formed of photodiodes. In this embodiment, the width of each of the light receiving elements 11-14 is set to (¼)P. Also, the light receiving elements 11-14 are adjacent to one another without spacings in the moving direction.

A light reception signal A+ outputted by the light receiving element 11, a light reception signal B− outputted by the light receiving element 12, a light reception signal A− outputted by the light receiving element 13, and a light reception signal B++outputted by the light receiving element 14 are inputted to a signal processing circuit 15. The light reception signals A+, B+, A− and B− are first, second, third and fourth light reception signals, respectively.

The signal processing circuit 15, as shown in FIG. 2A, has an OR circuit 21 to which the light reception signals A+, B+as the first, second light reception signals are inputted, an OR circuit 22 to which the light reception signals A−, B− as the third, fourth light reception signals are inputted, and an AND circuit 23 to which an output signal C of the OR circuit 21 and an output signal D of the OR circuit 22 are inputted.

Figure 4A:
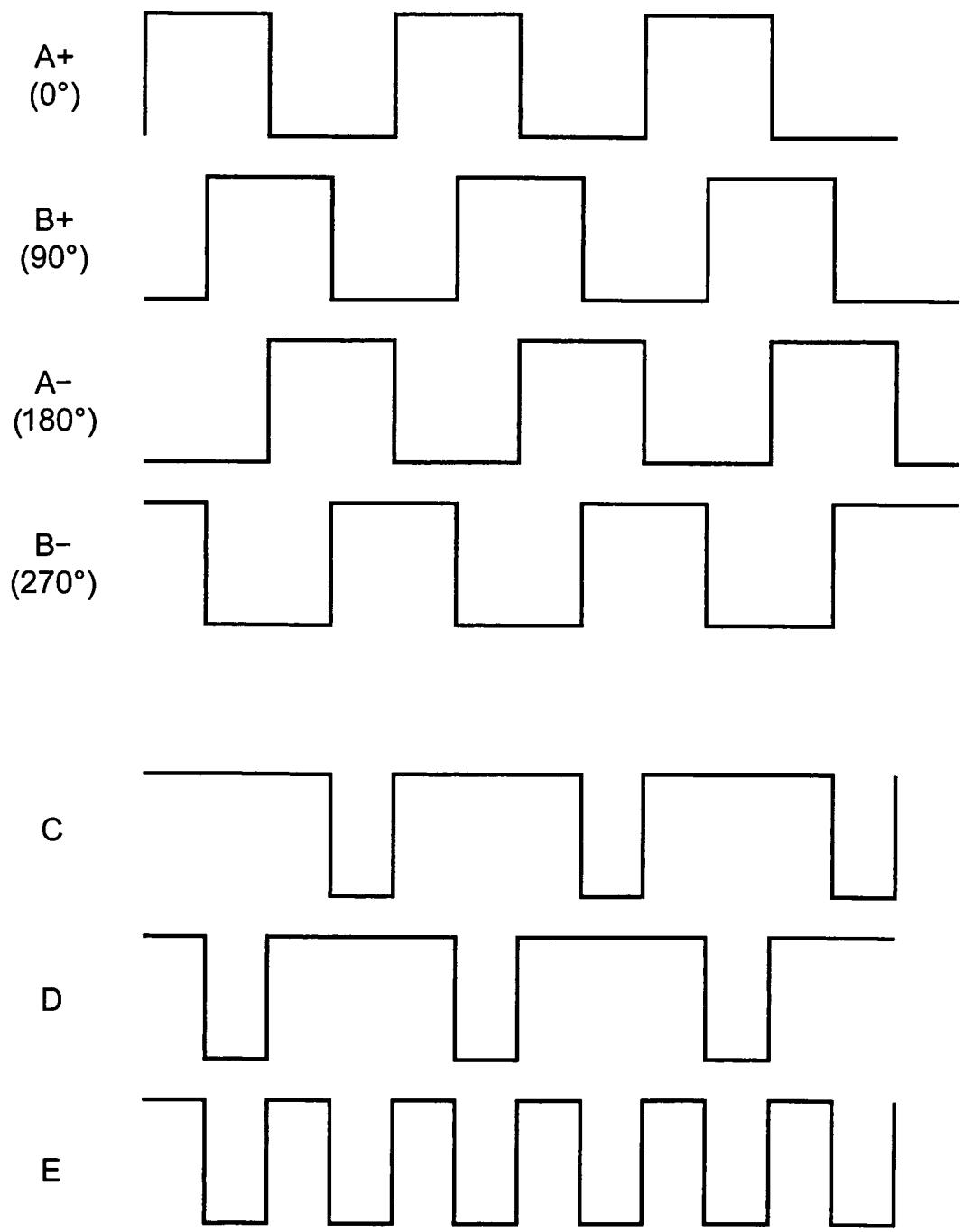
FIG. 4A is a waveform diagram showing individual signal waveforms in the first embodiment.

FIG. 4A shows signal waveforms of the light reception signals A+, B+, A−, B−. As shown in FIG. 4A, the light reception signal B+ is delayed in phase by 90° from the light reception signal A+, while the light reception signal A− is delayed in phase by 180° from the light reception signal A+. Also, the light reception signal B− is delayed in phase by 270° from the light reception signal A+.

Then, the OR circuit 21 computes a logical OR of the light reception signals A+ and B+ to output an output signal C having a signal waveform shown in FIG. 4A. Also, the OR circuit 22 computes a logical OR of the light reception signals A− and B− to output an output signal D having a signal waveform shown in FIG. 4A. The AND circuit 23 computes a logical AND of the output signal C and the output signal D to output an output signal E having a signal waveform shown in FIG. 4A.

According to this embodiment, the light reception signal A− shifted in phase by 180° from the light reception signal A+, and the light reception signal B− shifted in phase by 180° from the light reception signal B+ are inputted to the OR circuit 22 of the signal processing circuit 15. Accordingly, the signal processing circuit 15 has neither a need for a NOT circuit for inverting the light reception signal A+ nor a need for a NOT circuit for inverting the light reception signal B+.

Therefore, in the signal processing circuit 15, by balancing gate delays due to signal processing for the light reception signals A+, B+, A−, B−, occurrence of phase differences due to the gate delays can be avoided, making it possible to detect the mover with an output signal E which has a frequency twice higher than that of the light reception signals and which is excellent in duty precision and periodic precision.

In addition, in this first embodiment, a first NAND circuit, a second NAND circuit, and a NAND circuit may be provided in place of the first OR circuit 21, the second OR circuit 22, and the AND circuit 23, respectively.

Second Embodiment

Figure 2B:
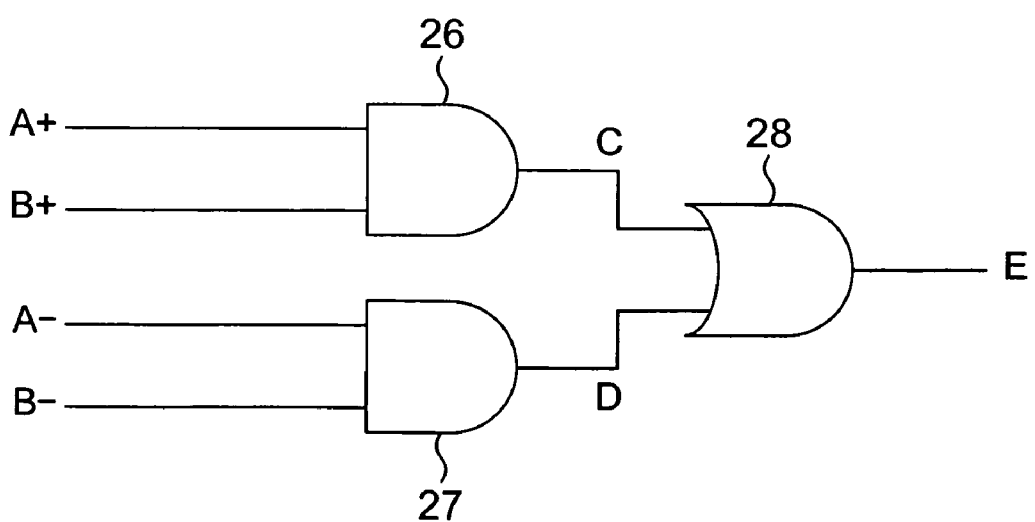
FIG. 2B is a view showing a structure of a signal processing circuit included in a second embodiment of the optical encoder of the invention.

Next, FIG. 2B shows a structure of a signal processing circuit included in a second embodiment of the optical encoder of the invention. This second embodiment differs from the foregoing first embodiment only in that a signal processing circuit shown in FIG. 2B is provided instead of the signal processing circuit shown in FIG. 2A of the first embodiment. Therefore, differences from the first embodiment will mostly be described in this second embodiment.

The signal processing circuit included in the second embodiment, as shown in FIG. 2B, has a first AND circuit 26, a second AND circuit 27, and an OR circuit 28. Inputted to the first AND circuit 26 are light reception signals A+ and B++which are different in phase by 90° from each other. Also, inputted to the second AND circuit 27 are light reception signals A− and B− which are different in phase by 90° from each other.

Figure 4B:
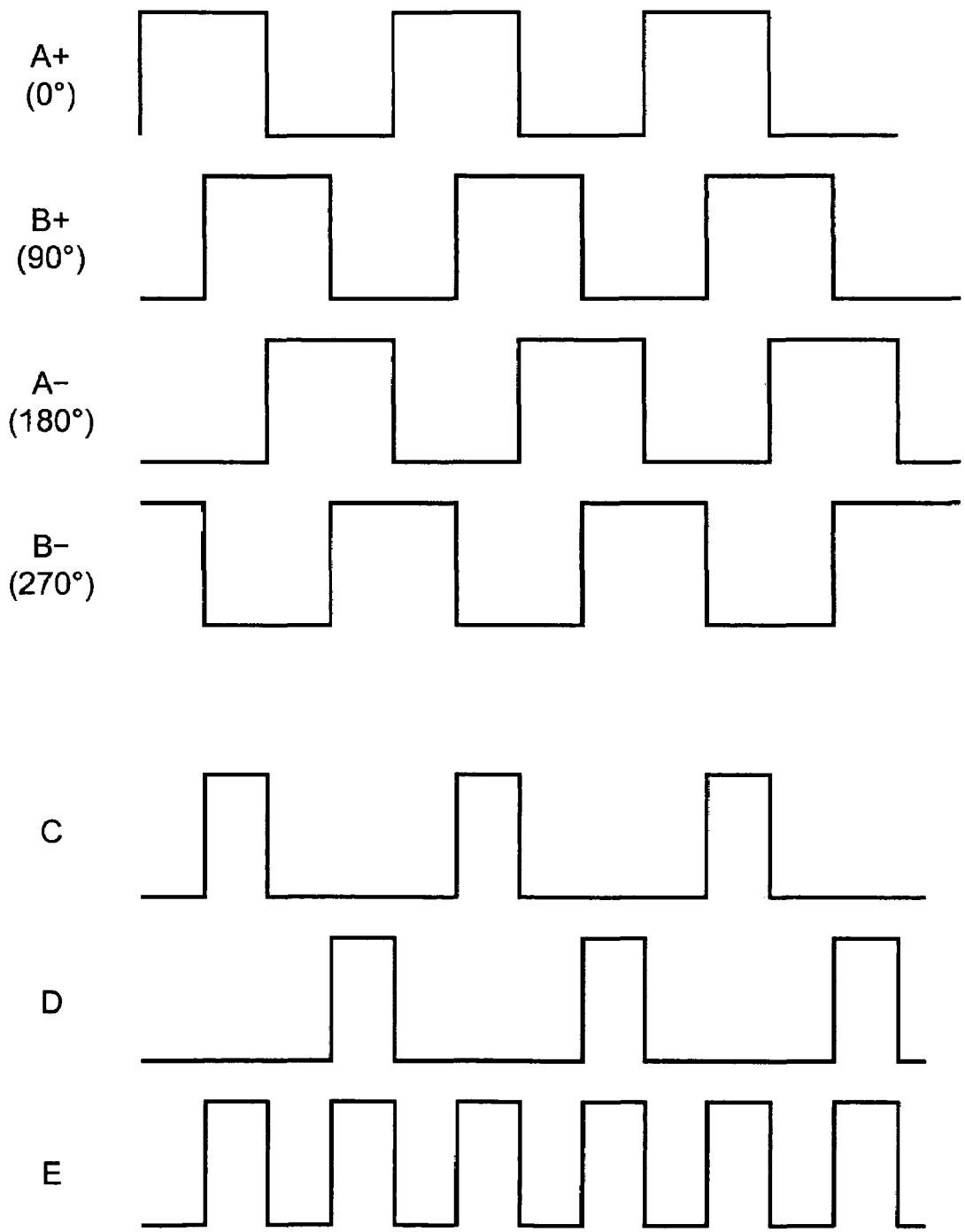
FIG. 4B is a waveform diagram showing individual signal waveforms in the second embodiment.

Therefore, the first AND circuit 26 computes a logical AND of the light reception signal A+ and the light reception signal B+ to output an output signal C having a signal waveform shown in the waveform diagram of FIG. 4B, and the second AND circuit 27 computes a logical AND of the light reception signal A– and the light reception signal B– to output an output signal D having a signal waveform shown in the waveform diagram of FIG. 4B. The OR circuit 28 computes a logical OR of the output signal C derived from the first AND circuit 26 and the output signal D derived from the second AND circuit 27 to output an output signal E having a signal waveform shown in the waveform diagram of FIG. 4B.

According to the second embodiment, the light reception signal A– shifted in phase by 180° from the light reception signal A+, and the light reception signal B– shifted in phase by 180° from the light reception signal B+, are inputted to the AND circuit 27. Therefore, the signal processing circuit has neither a need for a NOT circuit for inverting the light reception signal A+ nor a need for a NOT circuit for inverting the light reception signal B+. Thus, in the signal processing circuit, by balancing gate delays due to signal processing for the individual light reception signals A+, B+, A–, B–, occurrence of phase differences due to the gate delays can be avoided, making it possible to detect the mover with an output signal E which has a frequency twice higher than that of the light reception signals and which is excellent in duty precision and periodic precision.

In addition, in this second embodiment, a first NOR circuit, a second NOR circuit, and a NOR circuit may be provided instead of the first AND circuit 26, the second AND circuit 27, and the OR circuit 28, respectively.

First Comparative Example

Next, a first comparative example against the first and second embodiments will be described. The first comparative example differs from the first and second embodiments in that a signal processing circuit having the structure shown in FIG. 3A is included and that the light reception signal A++derived from the light receiving element 11 and the light reception signal B+derived from the light receiving element 14 are inputted to the signal processing circuit.

Figure 3A:
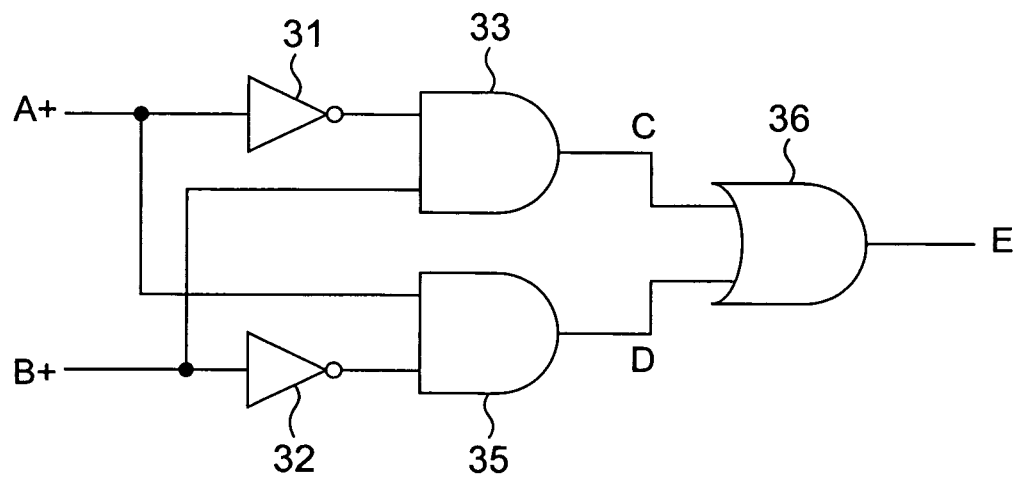
FIG. 3A is a view showing a structure of a signal processing circuit in a first comparative example which is a comparative example against the first, second embodiments.

In the signal processing circuit included in the first comparative example, as shown in FIG. 3A, the light reception signal A+ is inputted via an inverter 31 to an AND circuit 33, while the light reception signal B+ is inputted directly to the AND circuit 33. Therefore, the AND circuit 33 computes a logical AND of an inverted signal of the light reception signal A+ and the light reception signal B+ to output an output signal C having a signal waveform shown in the waveform diagram of FIG. 4D. Meanwhile, to an AND circuit 35, the light reception signal A+ is inputted as it is while the light reception signal B+ is inputted via an inverter 32. Therefore, the AND circuit 35 computes a logical AND of the light reception signal A+ and an inverted signal of the light reception signal B+ to output an output signal D having a signal waveform shown in the waveform diagram of FIG. 4D.

Figure 4C:
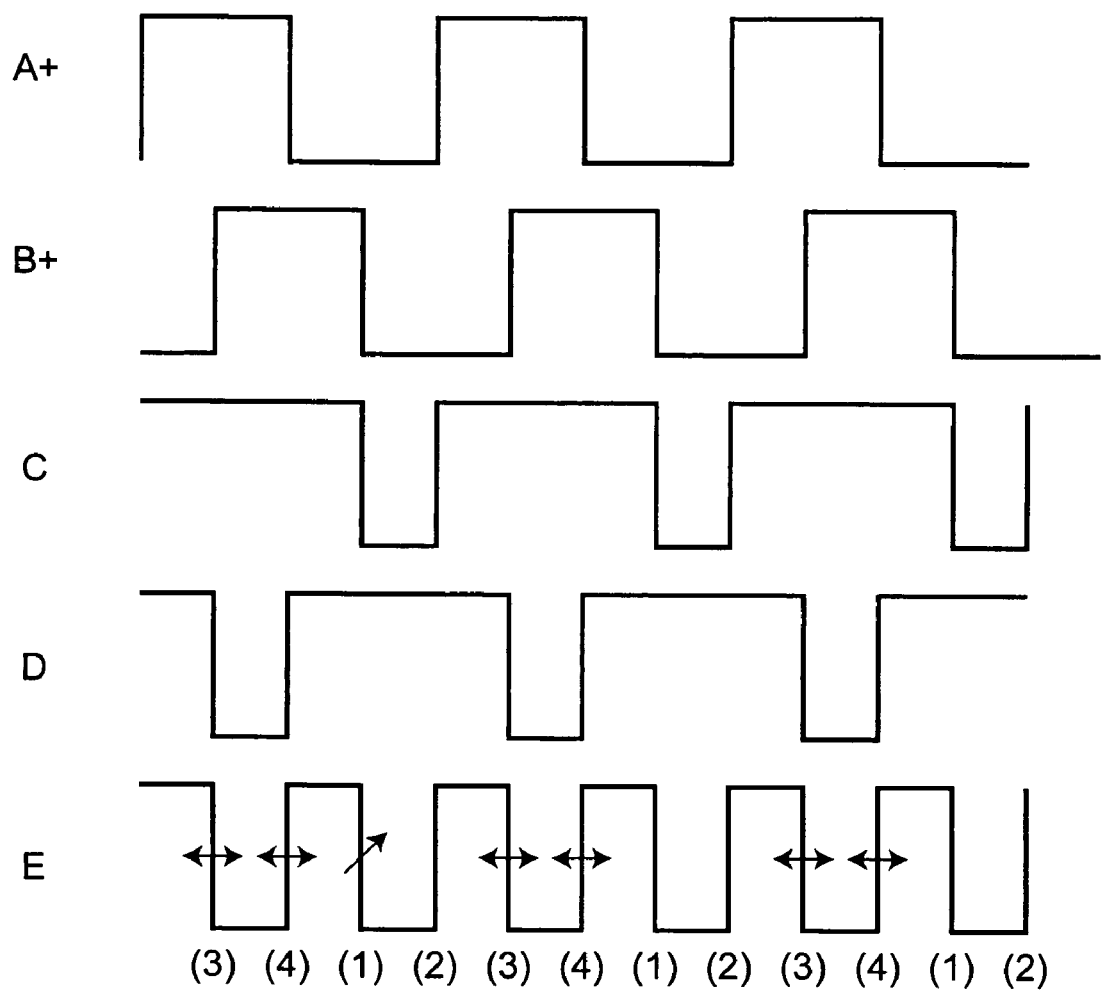
FIG. 4C is a waveform diagram showing individual signal waveforms in the second comparative example.
Figure 4D:
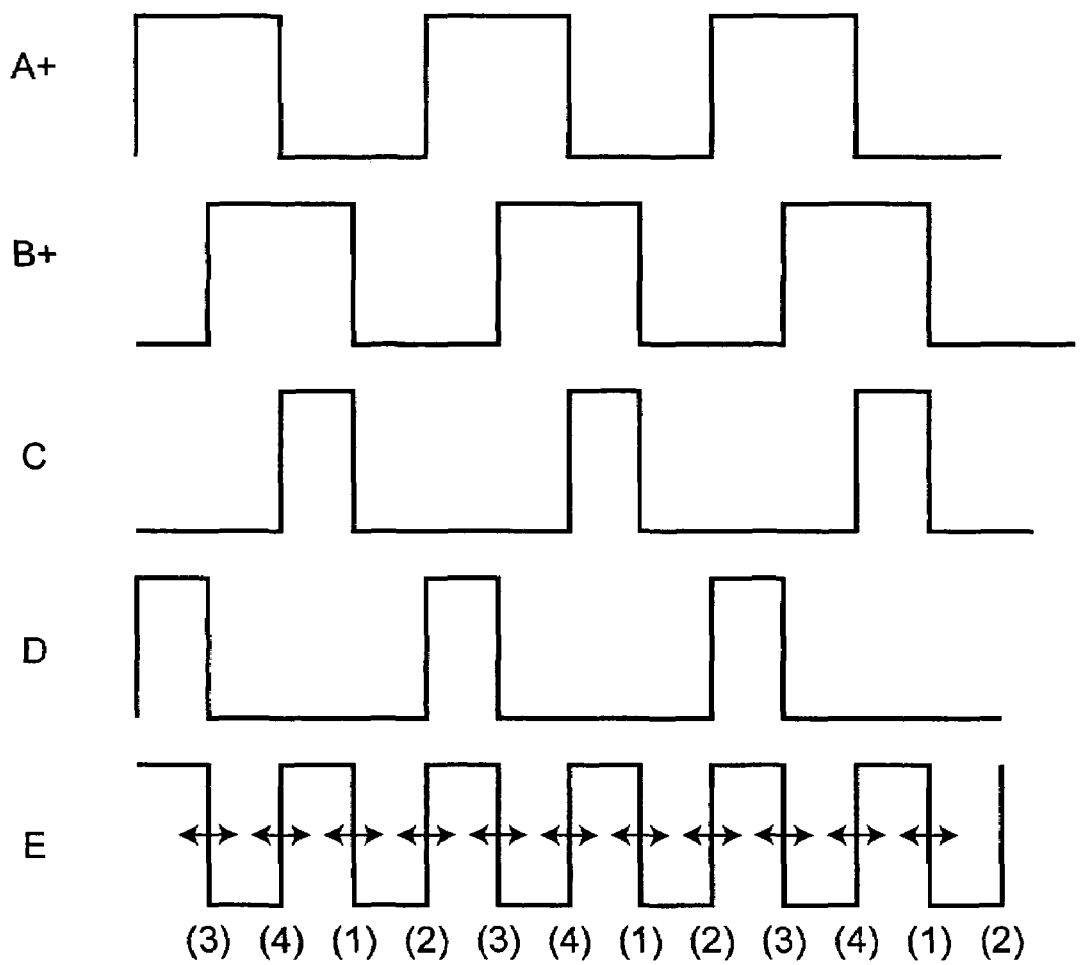
FIG. 4D is a waveform diagram showing individual signal waveforms in the first comparative example.

Then, the output signals C, D of the AND circuits 33, 35 are inputted to an OR circuit 36, and a logical OR of the two output signals C, D is computed so that an output signal E having a signal waveform shown in the waveform diagram of FIG. 4D is outputted from the OR circuit 36. The output signal E of the OR circuit 36 has a frequency twice higher than that of the light reception signals A+, B+, whereas one of the two light reception signals inputted to the AND circuits 33, 35 is inputted via an inverter. Because of this, a phase difference due to gate delay occurs to the input signals for the AND circuits 33, 35, so that the output signals C, D outputted by the AND circuits 33, 35 become poorly balanced. As a result, the output signal E of the OR circuit 36 more likely incurs periodic fluctuations at points (1), (2), (3), (4) shown in FIG. 4D, so that precisions (duty precision, periodic precision) of the output signal E worsen in comparison to the foregoing first and second embodiments.

Second Comparative Example

Next, a second comparative example against the first and second embodiments will be described. The second comparative example differs from the first and second embodiments in that a signal processing circuit having the structure shown in FIG. 3B is included and that the light reception signal A+ derived from the light receiving element 11 and the light reception signal B+ derived from the light receiving element 14 are inputted to the signal processing circuit.

Figure 3B:
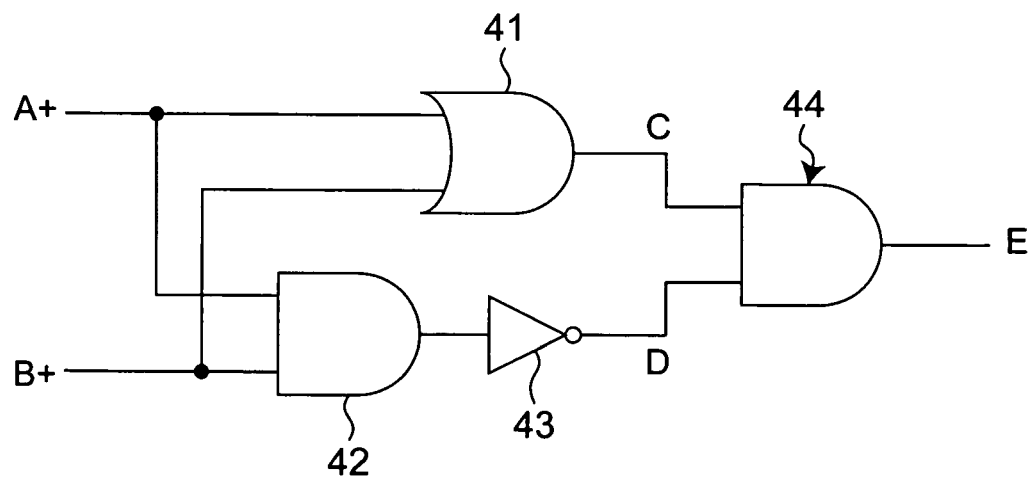
FIG. 3B is a view showing a structure of a signal processing circuit in a second comparative example which is a comparative example against the first, second embodiments.

In the signal processing circuit included in the second comparative example, as shown in FIG. 3B, the light reception signal A+ and the light reception signal B+are inputted directly to an OR circuit 41 and an AND circuit 42 without passing via inverters. Therefore, the OR circuit 41 computes a logical OR of the light reception signal A+ and the light reception signal B+ to output to an AND circuit 44 an output signal C having a signal waveform shown in the waveform diagram of FIG. 4C. Meanwhile, a signal outputted from computation of a logical AND of the light reception signal A+ and the light reception signal B+ by the AND circuit 42 is inverted by an inverter 43, and an output signal D having a signal waveform shown in the waveform diagram of FIG. 4C is inputted to the AND circuit 44.

Therefore, the AND circuit 44 computes a logical AND of the two output signals C, D to output an output signal E having a signal waveform shown in the waveform diagram of FIG. 4C. The output signal E of the AND circuit 44 has a frequency twice higher than that of the light reception signals A+, B+, whereas the output signal of the AND circuit 42 is inputted via the inverter 43 to the AND circuit 44. Because of this, a phase difference due to gate delay occurs to the output signals C, D, so that the output signals C, D become poorly balanced. As a result, assuming that point (1) of the signal waveform E shown in FIG. 4C is a starting point, the final output signal E, although less incurs periodic fluctuation at point (2), yet incurs increased periodic fluctuations at points (3), (4), so that precisions as an encoder signal worsen in comparison to the foregoing first and second embodiments.

(Detailed Description of Signal Processing Circuit)

Figure 5:
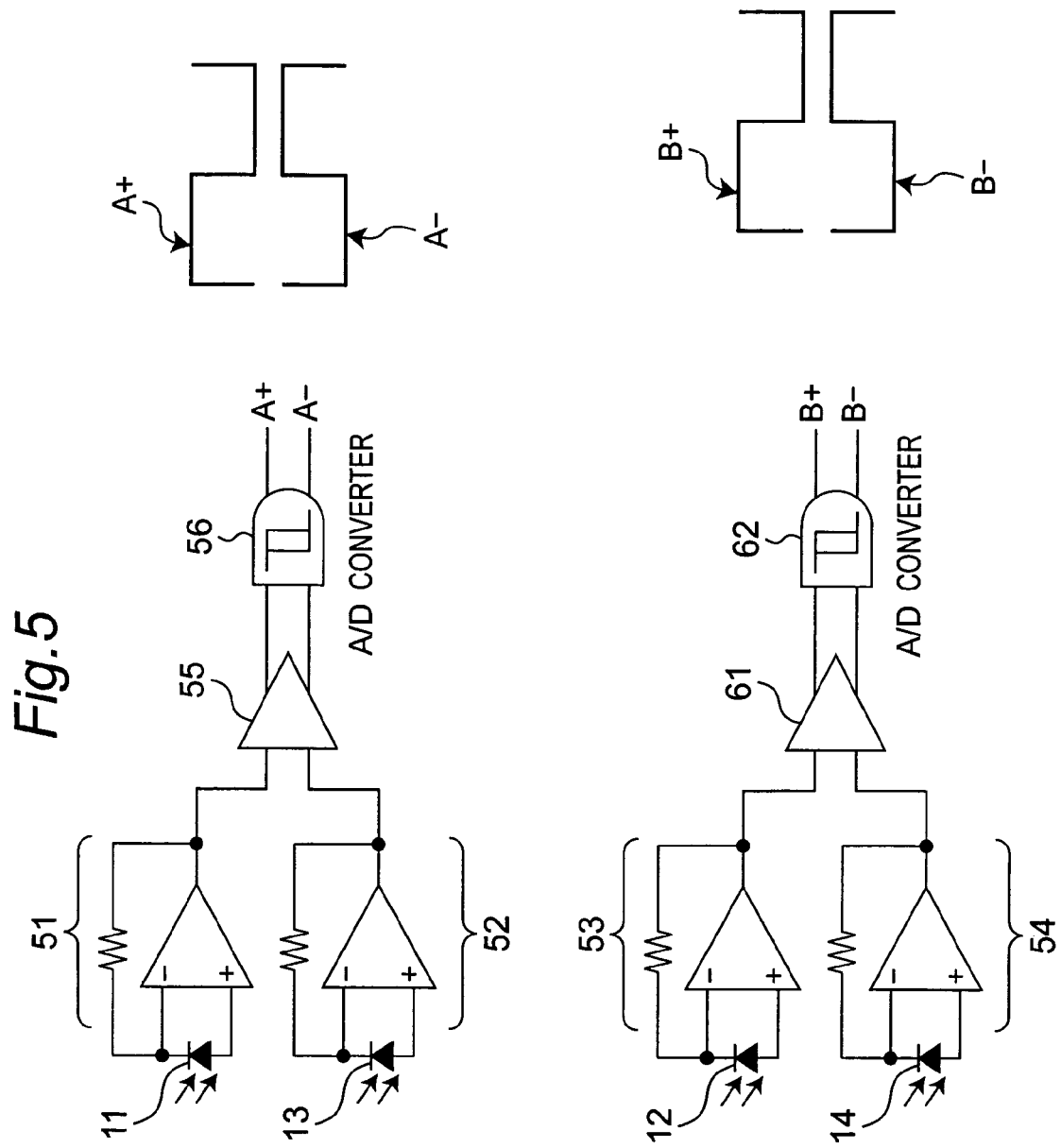
FIG. 5 is a view showing a circuit structure of a stage preceding a logical operation circuit in the signal processing circuit.

Next, an example of the structure of the signal processing circuit 15 included in the first embodiment will be described in more detail with reference to FIG. 5. FIG. 5 shows a circuit structure of the signal processing circuit 15 between the four light receiving elements 11-14 included in the light receiving section 2 and a logical operation circuit shown in FIG. 2A.

As shown in FIG. 5, the signal processing circuit 15 has first, second current/voltage converter sections 51, 52 connected to the light receiving elements 11, 13, respectively, and third, fourth current/voltage converter sections 53, 54 connected to the light receiving elements 12, 14, respectively. The current/voltage converter sections 51, 52, 53, 54 are each made up of a resistor and a comparator.

Outputs of the first, second current/voltage converter sections 51, 52 are connected to a comparator 55, and the comparator 55 is connected to a first A/D converter 56. Also, outputs of the third, fourth current/voltage converter sections 53, 54 are connected to a comparator 61, and the comparator 61 is connected to a second A/D converter 62.

Accordingly, a light reception signal A+ outputted by the light receiving element 11 and a light reception signal A– outputted by the light receiving element 13 are converted to voltages by the first, second current/voltage converter sections 51, 52, being compared with each other by the comparator 55, and the comparator 55 outputs a non-inverted signal and an inverted signal to the first A/D converter 56. Meanwhile, a light reception signal B− outputted by the light receiving element 12 and a light reception signal B+ outputted by the light receiving element 14 are converted to voltages by the third, fourth current/voltage converter sections 53, 54, being compared with each other by the comparator 61, and the comparator 61 outputs a non-inverted signal and an inverted signal to the second A/D converter 62.

Then, the first A/D converter 56 converts the non-inverted signal and the inverted signal inputted from the comparator 55 to digital signals to output digitized light reception signals A+, A−. These digitized light reception signals A+, A− are inputted to the OR circuits 21, 22 of FIG. 2A. Meanwhile, the second A/D converter 62 converts the non-inverted signal and the inverted signal inputted from the comparator 61 to digital signals to output digitized light reception signals B+, B−. These digitized light reception signals B+, B− are inputted to the OR circuits 21, 22 of FIG. 2A.

In this signal processing circuit 15, two pairs of light reception signals A+, A− and B+, B−, which are different in input phase by 180° from each other, are converted to voltages, and a non-inverted signal and an inverted signal resulting from comparison by the comparators 55, 61 are converted from analog to digital signals by the first, second A/D converters 56, 62 to output two pairs of digital signals A+, A− and B+, B− which are different in phase by 180° from each other.

As shown above, digital signals of two phases, positive phase and opposite phase, which are different in phase by 180°, can be extracted together by the A/D converters 56, 62 absolutely without involving occurrence of any delay between the two-phase output signals. The positive-phase digital signal A+ outputted by the first A/D converter 56 and the positive-phase digital signal B+ outputted by the second A/D converter 62 are shifted in phase by 90° from each other, while the opposite-phase output signal A− outputted by the first A/D converter 56 and the opposite-phase output signal B− outputted by the second A/D converter 62 are shifted in phase by 90° from each other. Thus, four output signals A+, B+, A−, B− which are shifted in phase each exactly by 90° from one another are obtained from the first, second A/D converters 56, 62.

The above description has been given on a case where the signal processing circuit of the first embodiment has the circuit structure shown in FIG. 5. However, it is of course also allowable that the signal processing circuit of the second embodiment has the circuit structure shown in FIG. 5.

Figure 6:
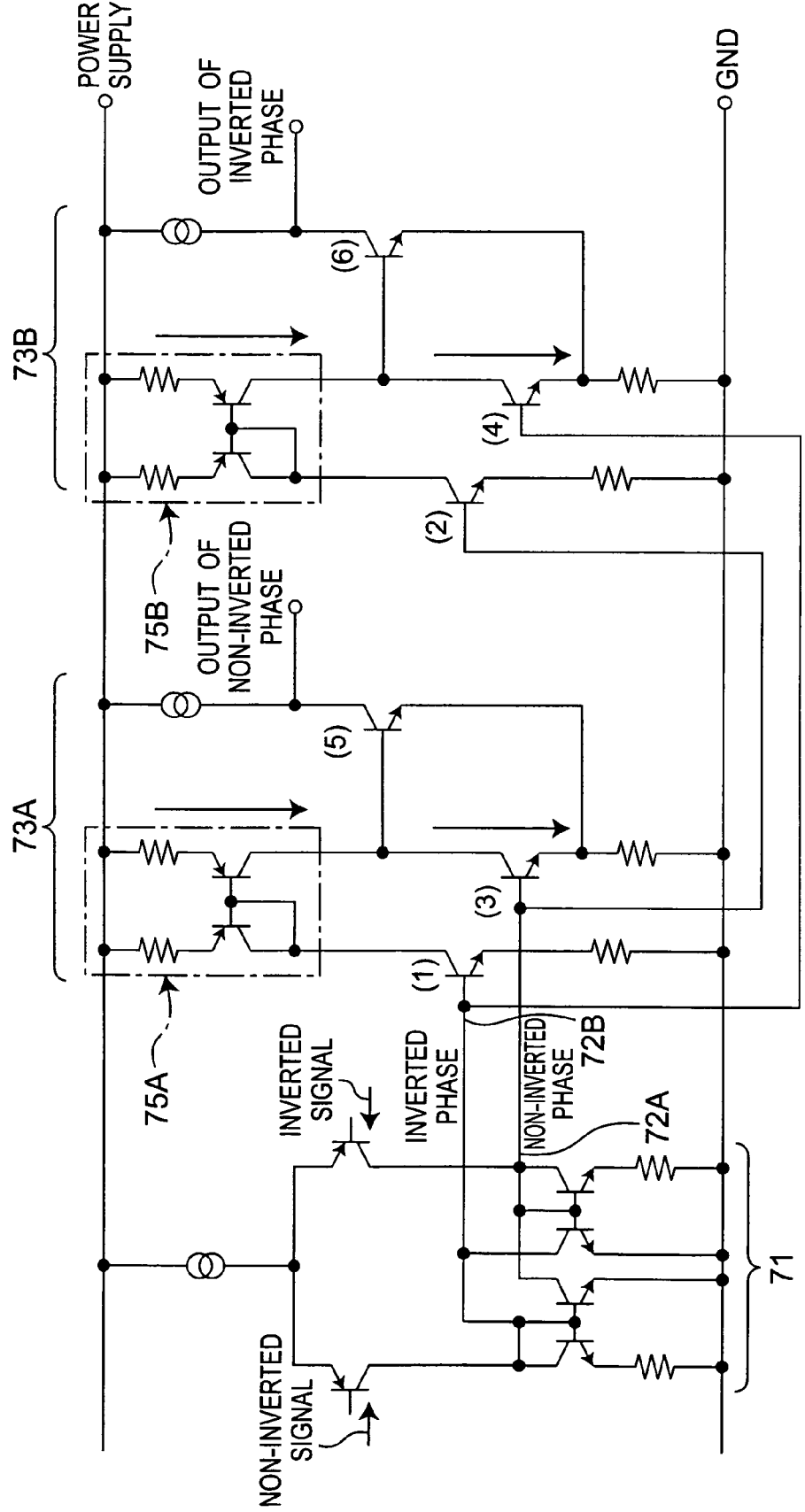
FIG. 6 is a view showing an example of the circuit structure of an A/D converter included in the signal processing circuit.

Next, FIG. 6 shows an example of the circuit structure of the first A/D converter 56. This first A/D converter 56 has an A/D converter section 71 to which a non-inverted signal and an inverted signal derived from the comparator 55 are inputted, output transistor drive sections 72A, 72B, and output transistor sections 73A, 73B. These output transistor drive sections 72A, 72B constitute a first drive section, while the output transistor sections 73A, 73B constitute a first output transistor section.

In this first A/D converter 56, an inverted-phase signal outputted by the A/D converter section 71 is inputted via the output transistor drive section 72B to a transistor (1) of the output transistor section 73A and a transistor (4) of the output transistor section 73B. Also, a non-inverted-phase signal outputted by the A/D converter section 71 is inputted via the output transistor drive section 72A to a transistor (3) of the output transistor section 73A and a transistor (2) of the output transistor section 73B.

Then, in the output transistor section 73A, a drive current of the transistor (1) is turned back by a current mirror circuit 75A of the output transistor section 73A, and a current difference resulting from subtracting a current flowing through the transistor (3) from a current flowing through the transistor (1) is extracted by the transistor (5), by which a non-inverted-phase output signal A+ is obtained. On the other hand, in the output transistor section 73B, a drive current of the transistor (2) is turned back by a current mirror circuit 75B of the output transistor section 73B, and a current difference resulting from subtracting a current flowing through the transistor (4) from a current flowing through the transistor (2) is extracted by a transistor (6), by which an inverted-phase output signal A− is obtained.

As shown above, according to the A/D converter 56 having the circuit structure shown in FIG. 6, the output transistor drive sections 72A, 72B are shared for the output transistor sections 73A, 73B that output a pair of output signals A+, A−. Thus, by commonizing the drive sections 72A, 72B for the two output signals A+ and A− of non-inverted phase and inverted phase, respectively, it becomes possible to prevent occurrence of phase differences due to gate delay between the two output signals A+ and A− of non-inverted-phase and inverted phase.

The above description has been given on a case where the first A/D converter 56 has the circuit structure shown in FIG. 6. However, it is also allowable that the second A/D converter 62 has the circuit structure shown in FIG. 6.

Third Embodiment

Figure 7:
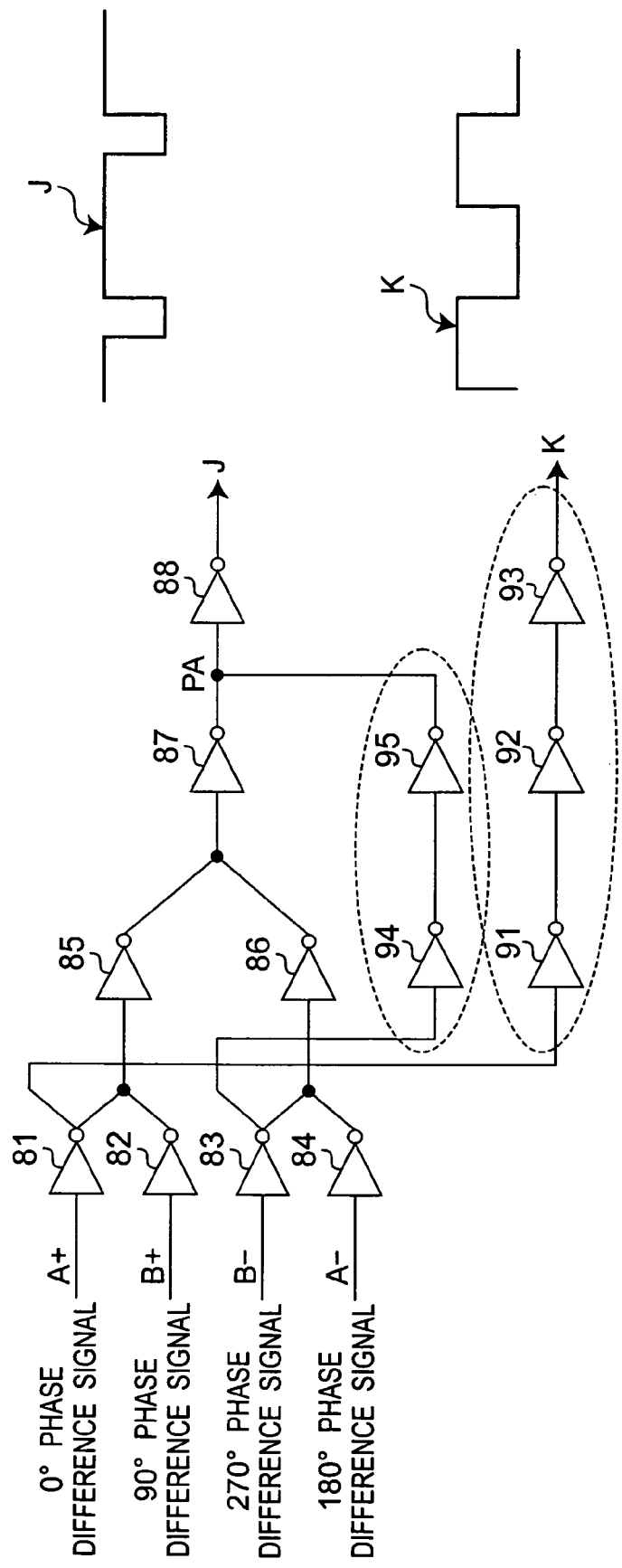
FIG. 7 is a view showing a signal processing circuit according to a third embodiment of the optical encoder of the invention.

Next, FIG. 7 shows a structure of a signal processing circuit included in a third embodiment of the optical encoder of the invention. This third embodiment differs from the foregoing first embodiment only in that a signal processing circuit shown in FIG. 7 is provided instead of the signal processing circuit shown in FIG. 2A of the first embodiment. Therefore, differences from the first embodiment will mostly be described in this third embodiment.

The signal processing circuit included in this third embodiment, as shown in FIG. 7, has first to fourth inverters 81-84, a fifth inverter 85 to which outputs of the first, second inverters 81, 82 are inputted, and a sixth inverter 86 to which outputs of the third, fourth inverters 83, 84 are inputted. The signal processing circuit also has a seventh inverter 87 to which outputs of the fifth, sixth inverters 85, 86 are inputted, and an eighth inverter 88 to which an output of the seventh inverter 87 is inputted.

The signal processing circuit further has a ninth inverter 91 to which an output of the first inverter 81 is inputted, a tenth inverter 92 to which an output of the ninth inverter 91 is inputted, and an eleventh inverter 93 to which an output of the tenth inverter 92 is inputted. Furthermore, the signal processing circuit has a twelfth inverter 94 to which an output of the third inverter 83 is inputted, and a thirteenth inverter 95 to which an output of the twelfth inverter 94 is inputted. An output of the thirteenth inverter 95 is connected to a connecting point PA between the seventh inverter 87 and the eighth inverter 88.

In this signal processing circuit, light reception signals A+, B+ which are different in phase by 90° from each other are inputted to the first, second inverters 81, 82, and light reception signals B−, A− which are different in phase by 90° from each other are inputted to the third, fourth inverters 83, 84. In this case, if the light reception signal A+ is a 0° phase difference signal, then the light reception signal B+, the light reception signal B−, and the light reception signal A− are a 90° phase difference signal, a 270° phase difference signal, and a 180° phase difference signal, respectively.

Then, in this signal processing circuit, the first inverter 81 outputs an inverted signal of the light reception signal A+, the second inverter 82 outputs an inverted signal of the light reception signal B+, and the inverted signal of the light reception signal A+ and the inverted signal of the light reception signal B+ are added up and inputted to the fifth inverter 85. As a result of this, the fifth inverter 85 outputs a signal corresponding to the signal waveform C shown in FIG. 4B. Meanwhile, the third inverter 83 outputs an inverted signal of the light reception signal B−, the fourth inverter 84 outputs an inverted signal of the light reception signal A−, and the inverted signal of the light reception signal B− and the inverted signal of the light reception signal A− are added up and inputted to the sixth inverter 86. As a result of this, the sixth inverter 86 outputs a signal corresponding to the signal waveform D shown in FIG. 4B.

Therefore, the seventh inverter 87 outputs, to the connecting point PA, an inverted signal of an addition signal (a signal corresponding to the signal waveform E of FIG. 4B) resulting from adding up the signal corresponding to the signal waveform C derived from the fifth inverter 85 and the signal corresponding to the signal waveform D derived from the sixth inverter 86.

Meanwhile, the third inverter 83 inputs an inverted signal of the light reception signal B− to the twelfth inverter 94, and the twelfth inverter 94 outputs to the thirteenth inverter 95 a signal corresponding to the light reception signal B−. Therefore, the signal waveform at this connecting point PA is a waveform resulting from addition of an inverted signal of the signal corresponding to the signal waveform E of FIG. 4B and a signal corresponding to the light reception signal B+, and a signal J having an inverted signal waveform of the addition-result signal waveform is outputted from the eighth inverter 88. The signal J outputted from the eighth inverter 88 has a duty ratio of 25%-75%.

Also, the signal outputted by the first inverter 81 (an inverted signal of the light reception signal A+) passes sequentially via the ninth, tenth, eleventh inverters 91, 92, 93, and the eleventh inverter 93 outputs a signal K having a signal waveform corresponding to the signal waveform of the light reception signal A. This signal K has a duty ratio of 50%-50%.

Thus, in this third embodiment, two output signals J, K which are equal in period and different in duty ratio from each other, are obtained. Further, these two output signals J, K, both having been obtained by passing via four-stage inverters, incur no phase differences due to gate delay, allowing a successful matching to be fulfilled between the two signals.

According to electronic equipment (copiers, printers or other printing devices, FA (Factory Automation) equipment, etc.) including the optical encoder described in any one of the first, second and third embodiments, it becomes realizable to provide high-reliability electronic equipment which is enabled to avoid occurrence of phase differences due to gate delay among signals and to detect any movement of the mover with high precision.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An optical encoder comprising: a light emitting section; a light receiving section having a plurality of light receiving elements placed in array along one direction in a region that can be reached by light derived from the light emitting section, and a mover having light-on portions which make the light incident on the light receiving elements and light-off portions which inhibit the light from being incident on the light receiving elements, the light-on portions and the light-off portions alternately pass through specified positions corresponding to the light receiving elements when the mover moves along the one direction, wherein the optical encoder detects movement of the mover, the optical encoder further comprising:

a signal processing section to which a first light reception signal and second, third and fourth light reception signals shifted in phase by 90°, 180°, 270° respectively from the first light reception signal are inputted from the light receiving section, and which balances gate delays due to signal processing for each of the first to fourth light reception signals with one another.

2. The optical encoder as claimed in claim 1, wherein the signal processing section comprises:

a first AND circuit or a first NOR circuit to which a pair of light reception signals different in phase by 90° from each other out of the first to fourth light reception signals are inputted;

a second AND circuit or a second NOR circuit to which a pair of light reception signals different in phase by 90° from each other other than the above-inputted pair of light reception signals out of the first to fourth light reception signals are inputted; and an OR circuit or a NOR circuit to which an output signal of the first AND circuit or first NOR circuit and an output signal of the second AND circuit or second NOR circuit are inputted.

3. The optical encoder as claimed in claim 1, wherein the signal processing section comprises:

a first OR circuit or a first NAND circuit to which a pair of light reception signals different in phase by 90° from each other out of the first to fourth light reception signals are inputted;

a second OR circuit or a second NAND circuit to which a pair of light reception signals different in phase by 90° from each other than the above-inputted pair of light reception signals out of the first to fourth light reception signals are inputted; and an AND circuit or a NAND circuit to which an output signal of the first OR circuit or first NAND circuit and an output signal of the second OR circuit or second NAND circuit are inputted.

4. The optical encoder as claimed in claim 1, wherein the signal processing section comprises:

a first A/D converter to which a pair of light reception signals different in phase by 180° from each other out of the first to fourth light reception signals are inputted and which outputs a pair of output signals different in phase by 180° from each other; and a second A/D converter to which a pair of light reception signals different in phase by 180° from each other than the above-inputted pair of light reception signals out of the first to fourth light reception signals are inputted and which outputs a pair of output signals different in phase by 180° from each other.

5. The optical encoder as claimed in claim 4, wherein the first A/D converter has a first output transistor section for outputting the pair of output signals and a first drive section for driving the first output transistor section, and the second A/D converter has a second output transistor section for outputting the pair of output signals and a second drive section for driving the second output transistor section, wherein the first drive section is shared by a pair of output signals outputted by the first output transistor section and the second drive section is shared by a pair of light reception signals outputted by the second output transistor section.

6. The optical encoder as claimed in claim 1, wherein the signal processing section has
a logical operation section which performs an equal number of times of logical operations for each of the first to fourth light reception signals.

7. Electronic equipment including the optical encoder as defined in claim 1.

\* \* \* \* \*